(12) United States Patent
Weiß et al.

(10) Patent No.: US 10,550,762 B2
(45) Date of Patent: Feb. 4, 2020

(54) APPARATUS FOR ADJUSTING THE LENGTH OF CONNECTING RODS IN AN INTERNAL COMBUSTION ENGINE

(71) Applicant: Dr. Ing. h.c. F. Porsche Aktiengesellschaft, Stuttgart (DE)

(72) Inventors: Timo Weiß, Walheim (DE); Andreas Misala, Bietigheim-Bissingen (DE); Artur Bias, Rutesheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 15/811,936

(22) Filed: Nov. 14, 2017

(65) Prior Publication Data
US 2018/0142617 A1 May 24, 2018

(30) Foreign Application Priority Data
Nov. 18, 2016 (DE) .................. 10 2016 122 239

(51) Int. Cl.
  *F02B 75/04* (2006.01)
  *F16C 7/06* (2006.01)
(52) U.S. Cl.
  CPC .............. *F02B 75/045* (2013.01); *F16C 7/06* (2013.01)
(58) Field of Classification Search
  CPC .......... F02B 75/045; F16C 23/10; F16C 7/06; F16C 2360/22

USPC ........................................................ 123/48 B
See application file for complete search history.

(56) References Cited

U.S. PATENT DOCUMENTS

| 9,810,162 | B2  |  11/2017 | Paul |  |
| 2015/0260109 | A1 | 9/2015 | Wittek | |
| 2016/0312714 | A1* | 10/2016 | Paul | F02D 15/02 |
| 2016/0319768 | A1* | 11/2016 | Suzuki | F02F 1/004 |

FOREIGN PATENT DOCUMENTS

| CN | 104662273 A | 5/2015 |
| CN | 106065812 A | 11/2016 |
| CN | 106089468 A | 11/2016 |

* cited by examiner

*Primary Examiner* — Stephen K Cronin
*Assistant Examiner* — Omar Morales
(74) *Attorney, Agent, or Firm* — RatnerPrestia

(57) ABSTRACT

An apparatus for adjusting the length of connecting rods in an internal combustion engine, having a shift guide plate arrangement which has shift guide plates which can be adjusted in one spatial direction for actuating connecting rod actuating devices which are integrated into the connecting rods for the purpose of changing the length of the respective connecting rod. The shift guide plates are connected fixedly to a carrier frame. The carrier frame is mounted in a stationary oil scraper arrangement such that it can be displaced in the spatial direction. The oil scraper arrangement has oil scrapers for stripping oil from the connecting rods.

17 Claims, 7 Drawing Sheets

APPARATUS FOR ADJUSTING THE LENGTH OF CONNECTING RODS IN AN INTERNAL COMBUSTION ENGINE

CROSS-REFERENCE TO RELATED APPLICATIONS

This application claims priority to German Patent Application No. 10 2016 122 239.9, filed Nov. 18, 2016, which is incorporated by reference herein in its entirety.

FIELD OF THE INVENTION

The invention relates to an apparatus for adjusting the length of connecting rods in an internal combustion engine, having a shift guide plate arrangement which has shift guide plates which can be adjusted in one spatial direction for actuating connecting rod actuating means which are integrated into the connecting rods for the purpose of changing the length of the respective connecting rod.

BACKGROUND OF THE INVENTION

Internal combustion engines, in particular those which are used in motor vehicles, are certainly configured in such a way that the length of the connecting rod which is assigned to the respective cylinder can be extended, whereby the reciprocating piston engine can work with a variable compression ratio during operation. A shift guide plate is used to change the length of the respective connecting rod, that is to say the spacing of the bearing points of the respective connecting rod, firstly in the crankshaft and secondly in the piston, by way of which shift guide plate connecting rod actuating means which are integrated into the connecting rod can be adjusted. By way of the adjustment of the respective connecting rod actuating means, depending on the selected technology, the length of the connecting rod is changed, for example by way of pivoting of two parts of the connecting rod with respect to one another, the one part being connected to the crankshaft and the other part being connected to the piston.

Oil scraper arrangements which have oil scrapers for stripping oil from the connecting rods are used in internal combustion engines. Said oil can therefore be fed in a targeted manner to an oil sump or an oil container of the internal combustion engine, whereby losses in the degree of efficiency of the internal combustion engine on account of increased splashing effort can be reduced considerably.

SUMMARY OF THE INVENTION

The apparatus according to aspects of the invention serves to adjust the lengths of connecting rods in the internal combustion engine. The apparatus has a shift guide plate arrangement which has shift guide plates which can be adjusted in one spatial direction for actuating connecting rod actuating means which are integrated into connecting rods for the purpose of changing the length of the respective connecting rod. The shift guide plates are connected fixedly to a carrier frame. The carrier frame is mounted in a stationary oil scraper arrangement such that it can be displaced in the one spatial direction. Said oil scraper arrangement has oil scrapers for stripping oil from the connecting rod.

The overall apparatus not only consists of the apparatus for adjusting the length of the connecting rods, but rather likewise brings about the stripping function for oil from the connecting rods on the basis of the combination with the stationary oil scraper arrangement.

Against said background, it is provided in accordance with one preferred development of the invention that the apparatus is configured as a pre-assembled unit. The components which serve to adjust the length of the connecting rods and to strip the oil from the connecting rods are therefore configured in a common, pre-assembled unit. Accordingly, said unit can be assembled at any desired location within the context of the pre-assembly and can then be mounted during the construction of the internal combustion engine.

The oil scraper arrangement is designed, in particular, in such a way that it has a plurality of oil scrapers in the movement region of the respective connecting rod. Said plurality of oil scrapers are preferably arranged behind one another in the movement direction of the respective connecting rod. This ensures in a simple way that, in the movement path of the connecting rod, oil can be stripped in an optimum manner from the connecting rod in the region of its crankshaft-side end, with the result that minimum splashing losses are incurred at most. The oil scrapers ensure that the oil which is stripped from the connecting rods is fed to an oil sump or oil container, and is therefore fed directly to the oil circuit again.

Under structural aspects and the aspect of particularly inexpensive production, it is considered to be particularly advantageous if the oil scraper arrangement is configured in one piece. In particular, the oil scraper arrangement is configured as a cast part.

Under functional and structural aspects, it is considered to be particularly advantageous if the carrier frame has two first frame sections which are arranged parallel to one another and run in the one spatial direction, and a plurality of second frame sections which are arranged transversely with respect to said first frame sections and are connected to the first frame sections, the shift guide plates being connected fixedly to the carrier frame in the region of the first frame sections. A carrier frame of this type can be produced very simply, with sufficient strength and relatively low material usage on account of the special frame construction.

It is considered to be particularly advantageous if the carrier frame is configured in one piece. In particular, the carrier frame is configured as a sheet metal part. This is preferably steel sheet here. This design and material selection makes it possible to bring about the functionality of the carrier frame with a relatively low use of material. A carrier frame which is designed in this way is particularly suitable for bringing about the relative displacement with respect to the oil scraper arrangement and, moreover, for forming a relatively stiff, in particular torsionally stiff, base for the shift guide plates.

The guided mounting of the carrier frame in the oil scraper arrangement is of particularly simple design if said oil scraper arrangement has guides for guiding the carrier frame in the one spatial direction. In particular, the oil scraper arrangement has guides for guiding the first frame sections of the carrier frame.

In order to adjust the position of the carrier frame, it is provided, in particular, that the carrier frame has a positively locking section for engaging an actuating means for displacing the carrier frame. Here, an attachment on one of the first frame sections of the carrier frame can have the positively locking section for engaging the actuating means.

The actuating means for displacing the carrier frame in the one spatial direction can be of different designs. It is considered to be particularly advantageous if the actuating means is mounted rotatably in the oil scraper arrangement and has an eccentric which interacts with the positively locking section of the carrier frame. By way of rotation of the eccentric, the carrier frame can therefore be moved to and fro with regard to the oil scraper arrangement.

The actuating means is preferably designed in such a way that it has a groove which is arranged perpendicularly with respect to its pivoting axis for displaceably receiving a web of a cross coupling element. It is provided here that another web, arranged perpendicularly with respect to the one web, of the cross coupling element serves for displaceably receiving an actuating part of an actuating motor. Said actuating motor is configured, in particular, as an electrically acting actuating motor.

Said cross coupling element therefore makes tolerance compensation possible with respect to an actuating motor which is flange-connected in a stationary manner, in the manner of an asymmetrical puzzle part geometry. Said tolerance compensation is ensured even when the apparatus which has the shift guide plate arrangement and the oil scraper arrangement is configured as a pre-assembled unit, in particular when at least that web of the cross coupling element which is assigned to the actuating means engages behind the actuating part in the region of the associated groove in a positively locking manner and is held in said groove. It is then merely necessary, after the assembly of the apparatus, to bring the actuating motor into operative connection with the cross coupling element in the region of the other web.

Under the aspect of a failsafe function of the shift guide plate arrangement, it is considered to be particularly advantageous if the actuating means is prestressed by means of a spring into an end position which corresponds to a final position of the carrier frame in the one spatial direction. If the actuating motor for displacing the shift guide plate arrangement and therefore for changing the length of the respective connecting rod fails, the spring brings about the return of the shift guide plate arrangement into the one end position in the one spatial direction, which end position is the failsafe end position. Under this aspect, the force of the spring can be relatively low.

The pre-assembled unit which is formed by the shift guide plate arrangement and the oil scraper arrangement can preferably be connected to a housing of the internal combustion engine by means of fastening means, in particular bolts.

Under the aspect of the pre-assembly of the unit, furthermore, it is considered to be advantageous if, in the state of the pre-assembled structural unit, the actuating means is held captively, in particular is fixed axially, by means of a securing element, in particular a securing clip. Said securing is advantageous, in particular, under the aspect of the maintenance of the exact position of the actuating means under the action of the spring.

It is likewise advantageous under the aspect of the pre-assembly of the unit if the carrier frame is provided with holding lugs for pre-fixing the carrier frame in the oil scraper arrangement in an end position of the carrier frame. If the carrier frame is displaced out of said one end position in the one spatial direction toward the other end position, the holding lugs are situated in a position, in which they do not engage behind the oil scraper arrangement.

The respective shift guide plates are preferably configured as a cast part or a sintered part. In particular, the respective shift guide plate is configured as a precision cast steel part or a sintered steel powder part.

The apparatus is preferably a constituent part of an internal combustion engine which is configured as a boxer engine. In principle, this can be any internal combustion engines which function in accordance with the reciprocating piston principle.

BRIEF DESCRIPTION OF THE DRAWING

One exemplary embodiment of the invention for clarifying the apparatus according to aspects of the invention is shown in the drawing and is described in greater detail in the following description. Here, the invention is not restricted to the described exemplary embodiment.

In the drawing.

DETAILED DESCRIPTION OF THE INVENTION

Figure 1:
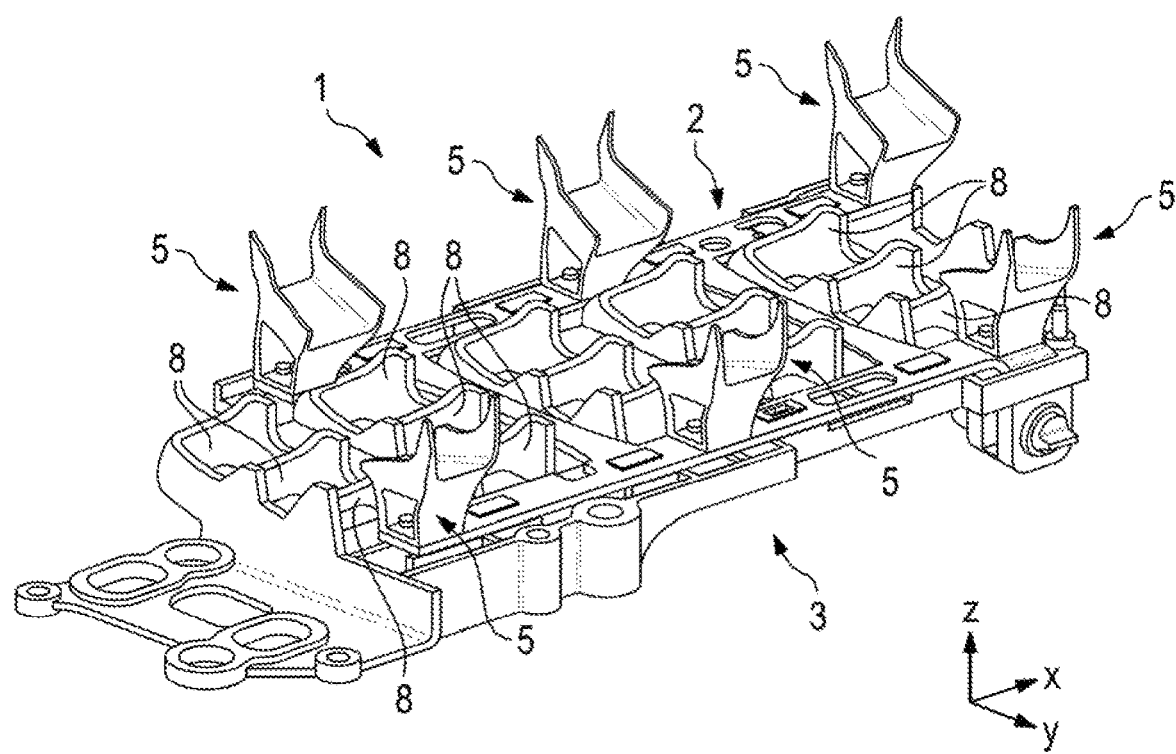
FIG. 1 shows the apparatus with a shift guide plate arrangement and an oil scraper arrangement in a three-dimensional illustration, as viewed obliquely from above.

The apparatus 1 which is illustrated in FIG. 1 has a shift guide plate arrangement 2 and an oil scraper arrangement 3. The apparatus 1 is configured as a pre-assembled unit and, in this state, is fed to a final assembly region of an internal combustion engine, which in this case is a six-cylinder boxer engine.

Figure 2:
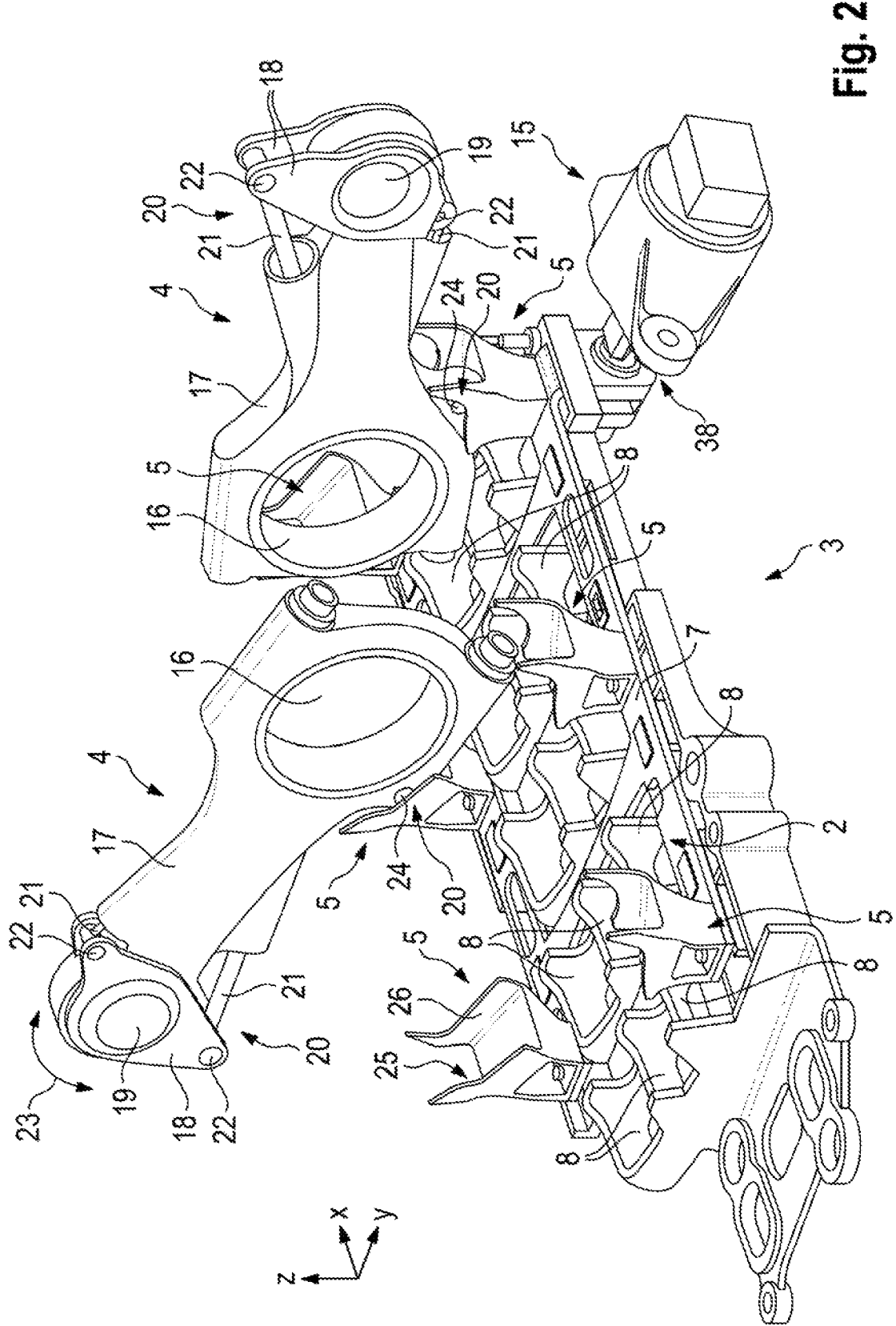
FIG. 2 shows the arrangement according to FIG. 1 with an additionally illustrated actuating motor and two connecting rods of a boxer engine which are assigned to different cylinder blocks, in a three-dimensional illustration, as viewed obliquely from above.

The apparatus 1 serves to adjust the length of connecting rods 4, as illustrated in FIG. 2 for two connecting rods, and therefore two cylinders of the boxer engine. The adjustment of the length of the connecting rods takes place by means of the shift guide plate arrangement 2 which has shift guide plates 5 which can be adjusted in one spatial direction X for actuating connecting rod actuating means 20 which are integrated into the connecting rods 4 for the purpose of changing the length of the respective connecting rod 4.

The shift guide plates 5, a total of six shift guide plates 5 in the present case, of which in each case three shift guide plates 5 are assigned to one of the two cylinder blocks, are connected fixedly to a carrier frame 7. The latter is mounted in the stationary oil scraper arrangement 3 such that it can be displaced in the spatial direction X. Said oil scraper arrangement 3 has oil scrapers 8 for stripping oil from the connecting rods 4.

Figure 8:
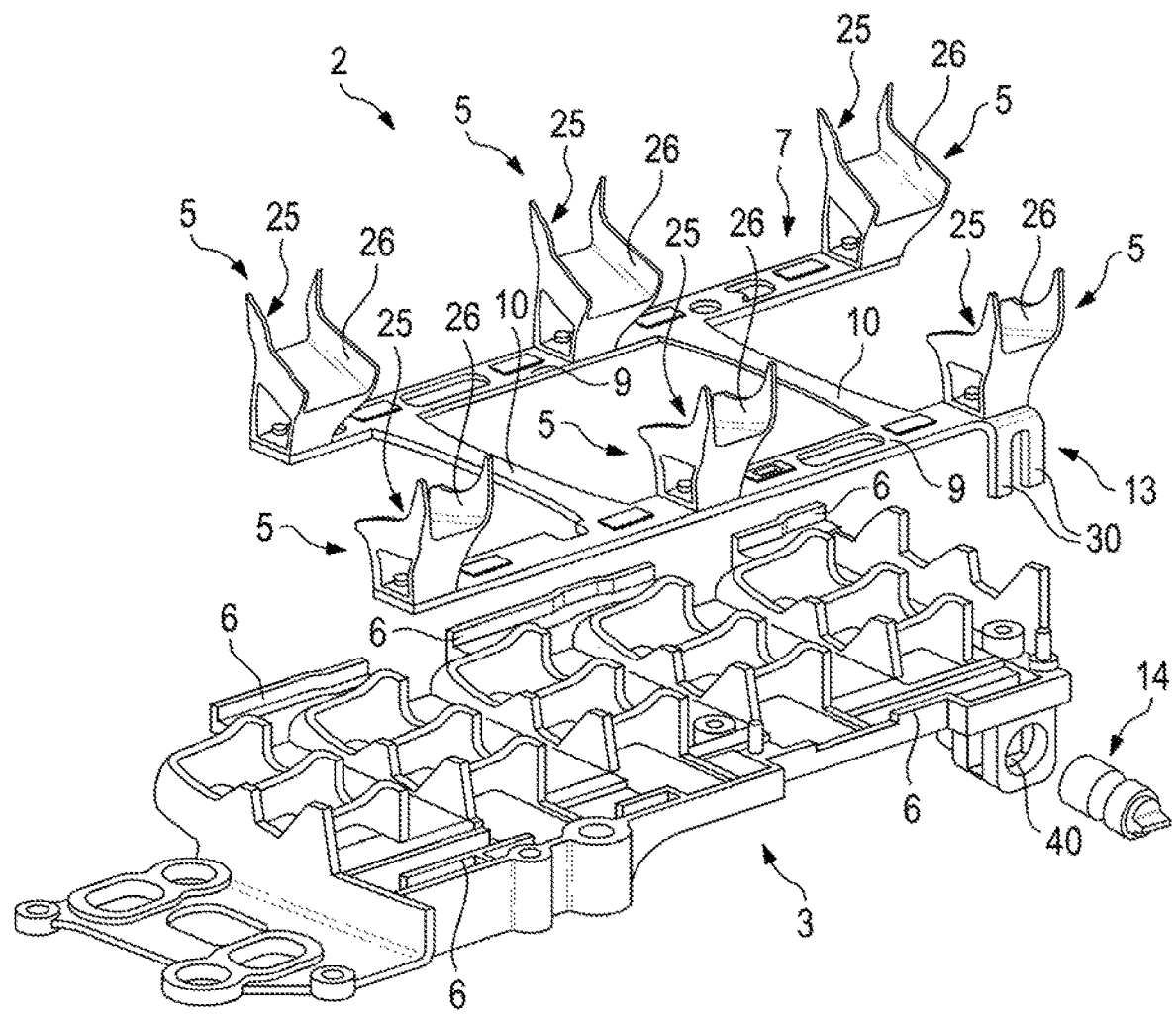
FIG. 8 shows the arrangement according to FIG. 1, in an exploded illustration, shown in a three-dimensional illustration, as viewed obliquely from above.
Figure 9:
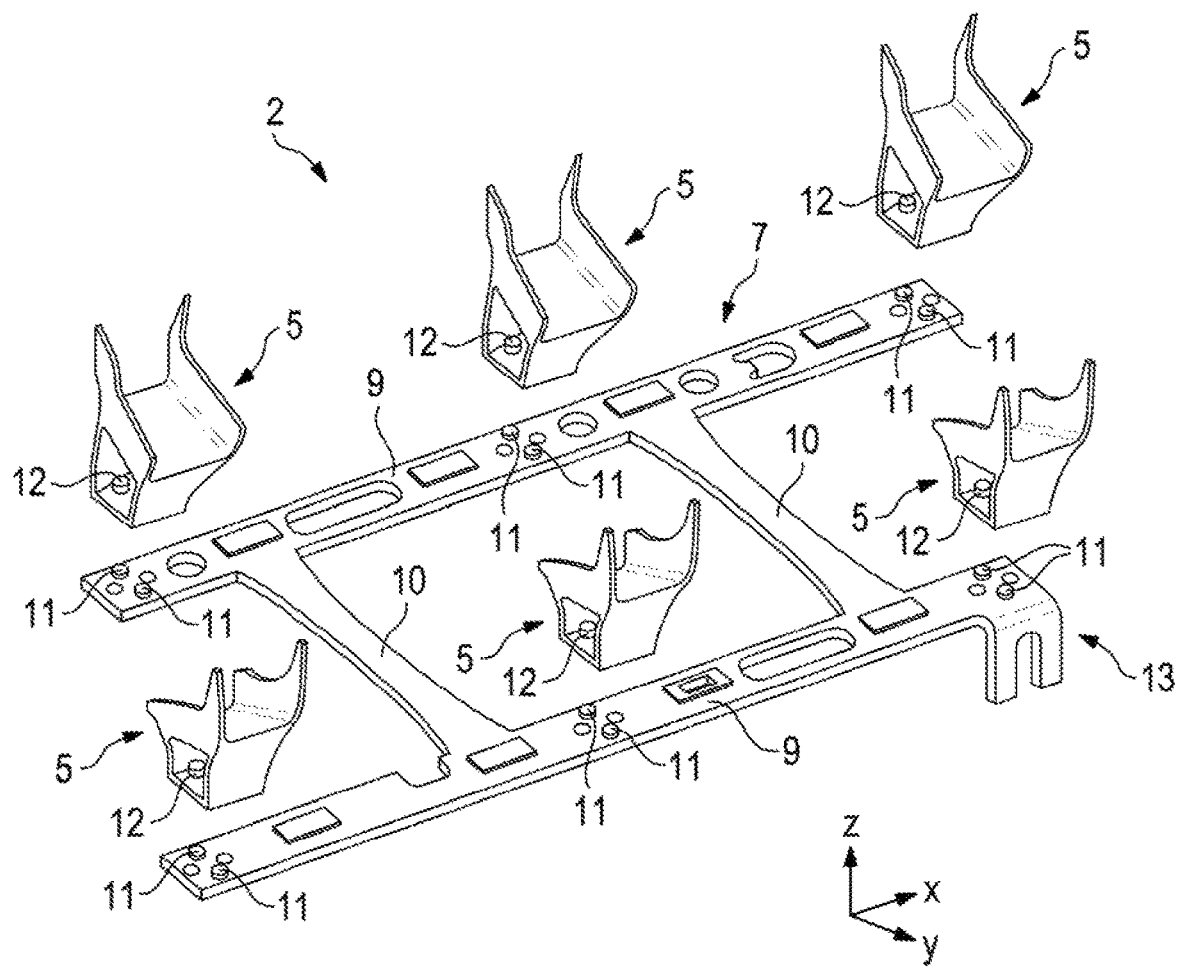
FIG. 9 shows the shift guide plate arrangement in an exploded illustration, shown in a three-dimensional illustration, as viewed obliquely from above.

As can be gathered, in particular, from the illustration of FIGS. 8 and 9, the carrier frame 7 is configured as a punched part. The carrier frame 7 consists of steel sheet. It has two frame sections 9 which are arranged parallel to one another and run in the spatial direction X, and two frame sections 10 which run transversely with respect to said frame sections 9, specifically in the spatial direction Y, and are connected to the frame sections 9. The shift guide plates 5 are connected fixedly to the carrier frame 7 in the region of the frame sections 9.

The three shift guide plates 5 which are connected to the one frame section 9 serve to shift three connecting rods 4, assigned to them, of the one cylinder row of the boxer engine, and the three shift guide plates 5 which are connected to the other frame section 9 serve to shift three associated connecting rods 4 of the other cylinder row of the boxer engine.

It can be gathered from the illustration of FIG. 9, in particular, that, in the connecting region of the respective shift guide plate 5, the carrier frame 7 has two embossments 11 which are configured as pin embossments, the embossments 11 being arranged at a spacing from one another. The embossments 11 therefore represent elevations with respect to the carrier frame 7 in the Z-direction, and are spaced apart in the Y-direction. The shift guide plate 5 is provided with adapted recesses 12 for the interaction of the respective shift guide plate 5 with said embossments 11 on the carrier frame 7, of which recesses 12 only one recess 12 can be seen in the case of the respective shift guide plate 5.

The respective shift guide plate 5 is pre-positioned in the region of the embossments 11 and recesses 12, and the shift guide plate 5 is subsequently connected fixedly to the carrier frame 7 by way of laser welding, or as an alternative electron beam welding.

In the region of a free end, the one of the two frame sections 9 is provided with an attachment 13 which is configured so as to be angled away during the production of the carrier frame 7. Said attachment 13 is of U-shaped configuration and represents a positively locking section for engaging an actuating means 14 (see, in particular, FIGS. 4 to 7). By means of said actuating means 14, the carrier frame 7 and, as a consequence thereof, also the shift guide plates 5 can be moved in the X-direction and in the opposite direction, for the purpose of changing the position of the shift guide plates 5 in said spatial direction X and in the opposite direction.

FIGS. 1 and 2 illustrate the interaction of the shift guide plate arrangement 2 with the oil scraper arrangement 3 and, furthermore, the interaction of an actuating motor 15 with the actuating means 14 and the arrangement of the connecting rods 4 which are assigned to two cylinders of different cylinder rows of the boxer engine and the connecting rod length of which can be adjusted.

Per cylinder or per respective connecting rod 4, the oil scraper arrangement 3 has a plurality of, specifically three oil scrapers 8 per connecting rod 4, which oil scrapers 8 are active adjacently with respect to a crankshaft-side big end 16 of the connecting rod 4, and strip excess oil which is situated there from the connecting rod 4 and discharge it downward to an oil pan or an oil sump.

The shift guide plate arrangement 2 is mounted in the oil scraper arrangement 3 and can be displaced with regard to the latter exclusively in the X-direction, on account of the action via the actuating motor 15.

As can be gathered from the illustration of FIG. 2, the respective connecting rod 4 is of multiple-piece configuration, with a connecting rod section 17 which has the big end 16, and a connecting rod section 18 which is mounted in said connecting rod section 17 such that it can be pivoted about an X-axis and has a piston-side, eccentric, small end 19. An actuating mechanism 20 having two actuating rods 21 is active between the two connecting rod sections 17 and 18. Said actuating rods 21 are mounted in a bearing axis 22 of the connecting rod section 18 and can be extended out of the connecting rod section 17.

Furthermore, a pin 24 which is arranged in the connecting rod section 17 in the region of the big end 16 and can be displaced to and fro in the X-direction is a constituent part of the actuating mechanism 20. Said pin 24 can be moved to and fro by means of the associated shift guide plate 5. To this end, the respective shift guide plate 5 has a guide plate section 25 and a guide plate section 26. If the pin 24 makes contact with the guide plate section 25, the pin 24 is displaced in the X-direction on account of the contour of the guide plate section 25 and leads to a change in the length of the connecting rod 4 in the one direction. If, in contrast, the carrier frame 7 is displaced counter to the X-direction by means of the actuating motor 15, the other guide plate section 26 of the shift guide plate 5 makes contact with the pin 24 and pushes the latter back again, with the result that, as a consequence of this, the actuating rod 1 retracts and the connecting rod length changes in the opposite direction.

In specific terms, during the displacement of the pin 24 in the X-direction, the one actuating rod 21 is extended, with simultaneous retraction of the other actuating rod 21. In the case of the extension of the one actuating rod 21, the connecting rod section 17 is pivoted in the manner of a rocker arm, and therefore the eccentric small end 19 is also pivoted, with the result that the connecting rod length changes, for example becomes greater. If the pin 24 is displaced again counter to the X-direction, the other actuating rod 21 is extended hydraulically on account of this movement, with simultaneous retraction of the one actuating rod 21, with the result that the connecting rod section 18 moves back, and therefore the eccentric small end 19 also moves back, with the result that the connecting rod length changes again in the opposite direction, and thus becomes smaller in accordance with the example. The pivoting directions of the connecting rod section 18 are indicated by way of the double arrow.

The oil scraper arrangement 3 has guides 6 in order to guide the carrier frame 7 in the region of the two frame sections 9 in the X-direction.

Figure 3:
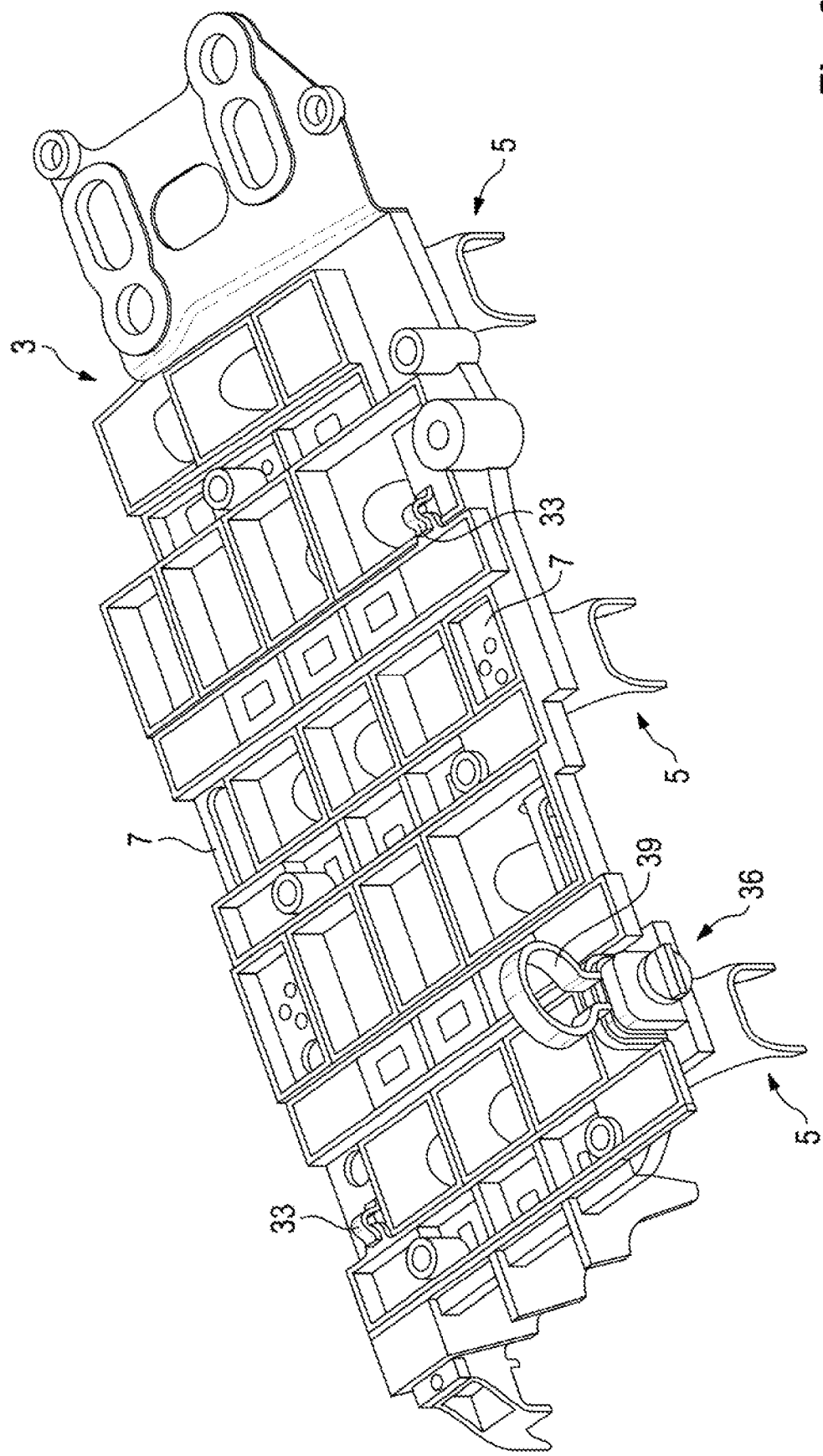
FIG. 3 shows the arrangement according to FIG. 1, in a view from below, shown in a three-dimensional illustration.
Figure 4:
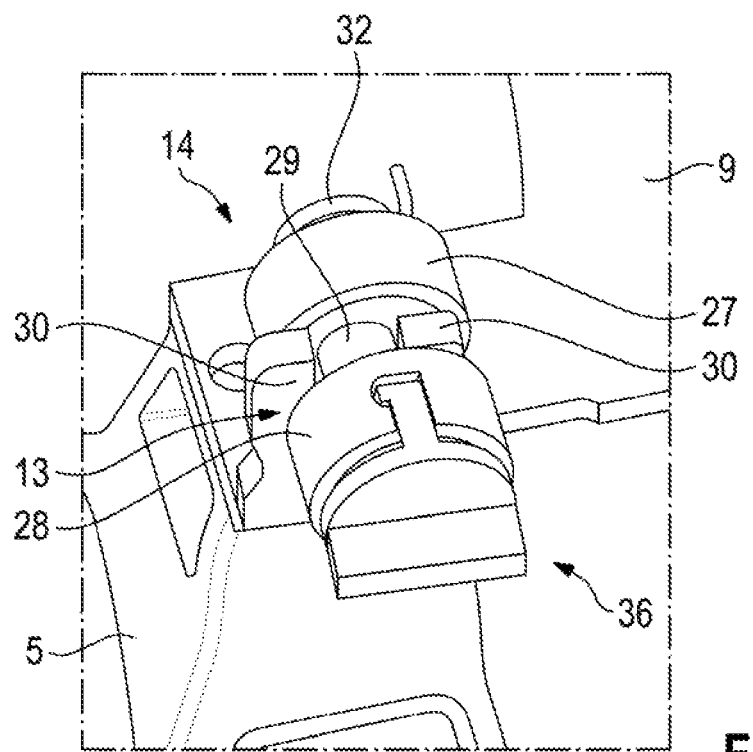
FIG. 4 shows, in relation to the illustration in FIG. 3, a detail of an actuating means which interacts with a carrier frame of the shift guide plate arrangement.
Figure 5:
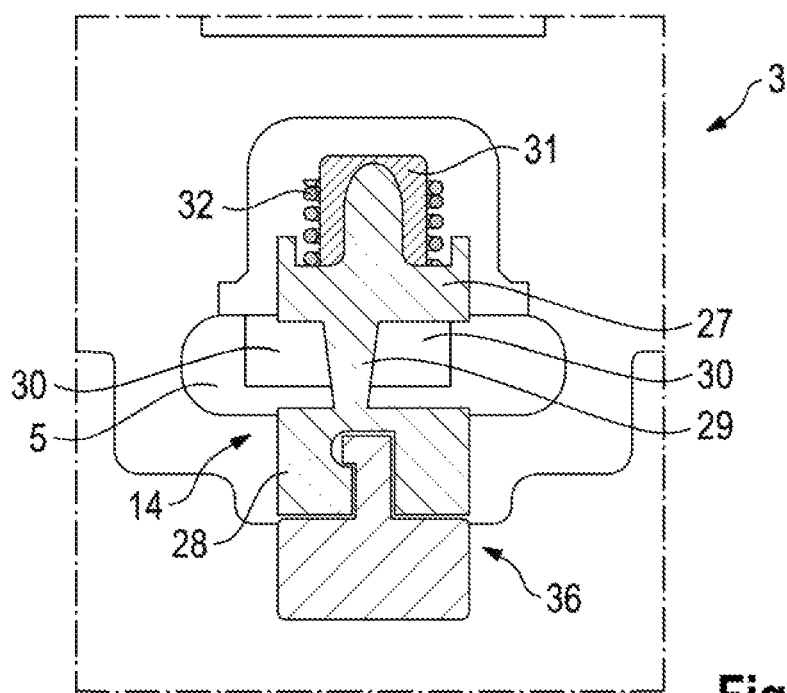
FIG. 5 shows a section in the plane X-Y through the arrangement according to FIG. 4, illustrated together with the oil scraper arrangement.

The actuating means 14 which is illustrated, in particular, in FIGS. 4 to 7 is inserted into an associated opening 40, running axially in the Y-direction, of the oil scraper arrangement 3, and is mounted rotatably there with a small radial play. The actuating means 14 has two cylinder sections 27, 28 which are arranged at a spacing from one another and are connected by an eccentric 29. The diameter of the eccentric 29 is slightly smaller than the spacing of the two limbs 30 of the U-shaped attachment 13. By way of rotation of the actuating means 14 about the Y-axis, the carrier frame 7 with the shift guide plates 5 is moved to and fro during a complete revolution of the eccentric 29 on account of the eccentricity of the eccentric 29. A cylindrical projection 31 on the cylinder section 27 receives a spring 32. The latter is hooked with its ends firstly into the cylinder section 27 and secondly into the oil scraper arrangement 3, with the result that it prestresses the eccentric 29 and therefore the carrier frame 7 into a defined end position which is a failsafe end position and is illustrated in FIG. 3. In said position, holding lugs 33 engage behind projections of the oil scraper arrangement 3 in an X-Y plane.

Figure 6:
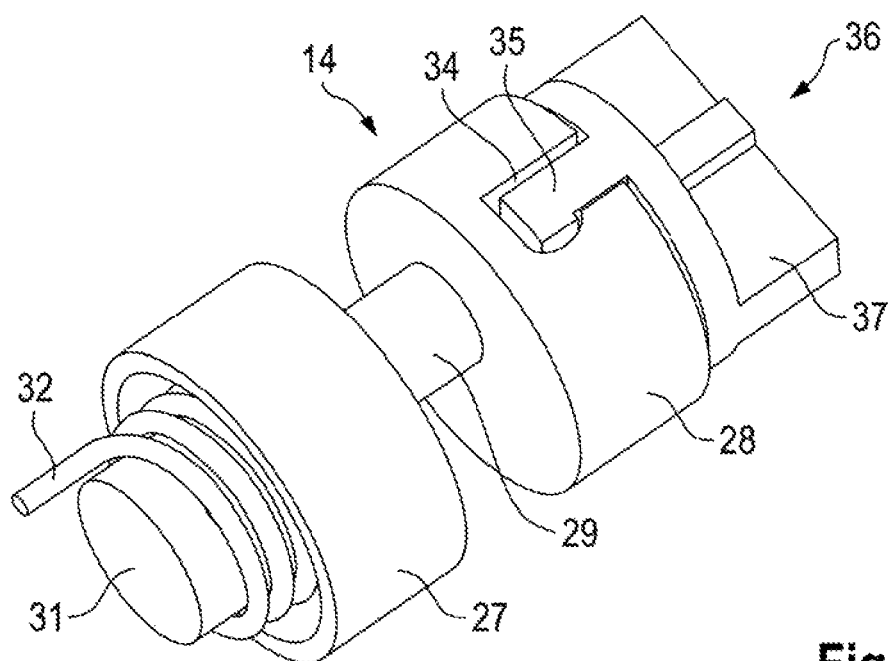
FIG. 6 shows the actuating means which is illustrated in FIG. 4, in a three-dimensional illustration.
Figure 7:
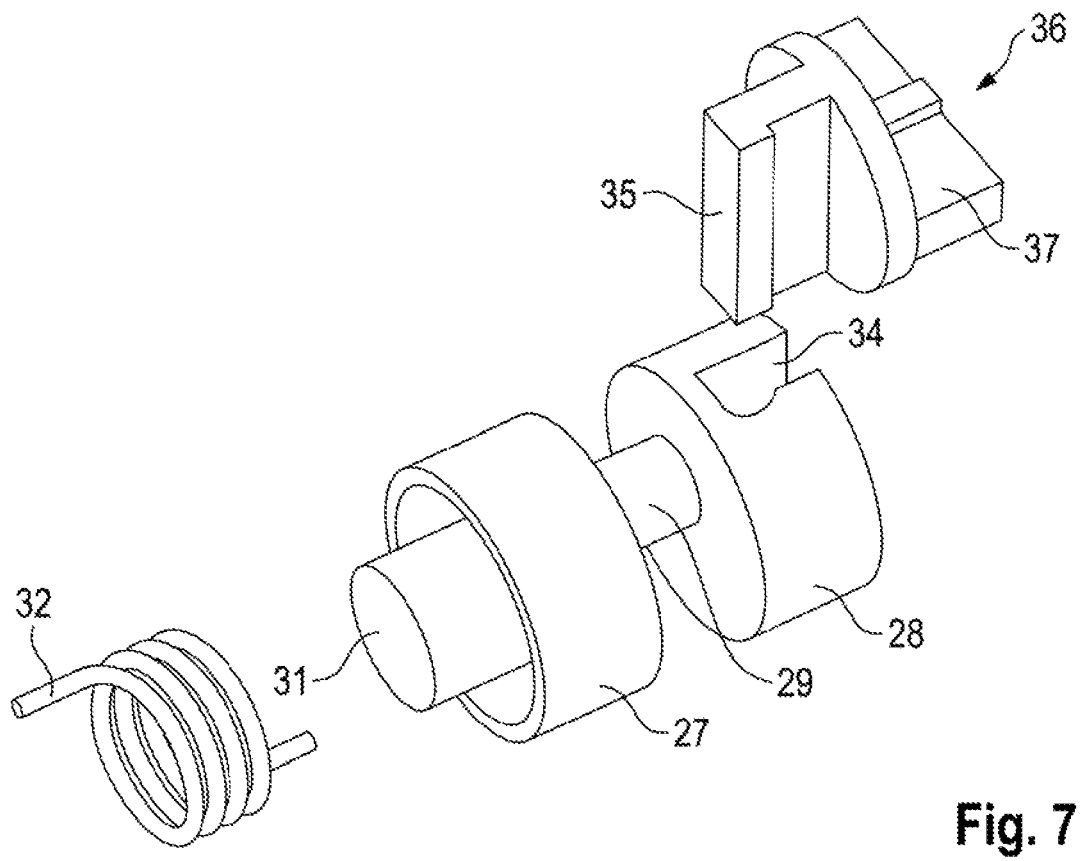
FIG. 7 shows the actuating means according to FIG. 6 in an exploded illustration.

The cylinder section 28 is provided with a groove 34 which is arranged perpendicularly with respect to its pivoting axis for displaceably receiving a web 35 of a cross coupling element 36. On its side which faces away from the web 35, said cross coupling element 36 has a further web 37 perpendicularly with respect to said web 35. Said web 37 serves to interact in a positively locking manner with a groove 38 of the electric actuating motor 15. Therefore, the attachment of the actuating motor 15 to the eccentric 29 takes place via the cross coupling element 36 for the purpose of tolerance compensation with respect to the actuating motor 15. The geometry which is illustrated in FIGS. 6 and 7 shows that the cross coupling element 36 is configured as a captive pre-assembled part with an asymmetrical puzzle part geometry.

Since the apparatus 1 is designed as a pre-assembled unit, it is provided that, in the state of the pre-assembled structural unit, the shift guide plate arrangement 2 is held captively by means of a securing clip 39. The latter is plugged in a positively locking manner into a groove arrangement of the oil scraper arrangement 3, and prevents an axial displacement of the shift guide plate arrangement 2, and therefore a displacement in the Y-direction, in addition with consideration of the spring 32 which acts. Said securing clip 39 which prevents a displacement of the shift guide plate arrangement 2 holds the latter in the secured position, in which the holding lugs 33 also engage behind the oil scraper arrangement 3. The actuating means 14 is in turn held by the attachment 13 of the carrier frame 7 via the eccentric 29 in the oil scraper arrangement 3, and said attachment 13 in turn holds the spring 32 and the coupling 36 in position. Within the context of the assembly of the internal combustion engine, and therefore after the apparatus is attached, the securing clip 39 is removed from the apparatus 1 and discarded.

LIST OF DESIGNATIONS

1 Apparatus
2 Shift guide plate arrangement
3 Oil scraper arrangement
4 Connecting rod
5 Shift guide plate
6 Guide
7 Carrier frame
8 Oil scraper
9 Frame section
10 Frame section
11 Embossment
12 Recess
13 Attachment
14 Actuating means
15 Actuating motor
16 Connecting rod big end
17 Connecting rod section
18 Connecting rod section
19 Connecting rod small end
20 Actuating mechanism
21 Actuating rod
22 Bearing axis
23 Pivoting directions
24 Pin
25 Guide plate section
26 Guide plate section
27 Cylinder section
28 Cylinder section
29 Eccentric
30 Limb
31 Projection
32 Spring
33 Holding lug
34 Groove
35 Web
36 Cross coupling element
37 Web
38 Groove
39 Securing clip
40 Opening

What is claimed is:

1. An apparatus for adjusting a length of connecting rods in an internal combustion engine, the apparatus comprising:
    a shift guide plate arrangement which has shift guide plates that are configured to be adjusted in one spatial direction for actuating connecting rod actuating means that are integrated into the connecting rods for the purpose of changing the length of the respective connecting rod,
    wherein the shift guide plates are fixedly connected to a carrier frame, the carrier frame being mounted in a stationary oil scraper arrangement such that the carrier frame is configured to be displaced in the spatial direction, and the oil scraper arrangement having oil scrapers for stripping oil from the connecting rods, and wherein the oil scrapers protrude upward toward the shift guide plates.

2. The apparatus as claimed in claim 1, wherein the apparatus is configured as a pre-assembled unit.

3. The apparatus as claimed in claim 1, wherein the oil scraper arrangement has a plurality of oil scrapers that are positioned in a movement region of the respective connecting rod, and are arranged behind one another in a movement direction of the respective connecting rod.

4. The apparatus as claimed in claim 1, wherein the oil scraper arrangement is configured in one piece as a cast part.

5. The apparatus as claimed in claim 1, wherein the carrier frame is a one piece steel sheet metal part.

6. The apparatus as claimed in claim 1, wherein the carrier frame has two first frame sections which are arranged parallel to one another and run in said spatial direction, and a plurality of second frame sections which are arranged transversely with respect to said first frame sections and are connected to the first frame sections, the shift guide plates being connected fixedly to the carrier frame in the region of the first frame sections.

7. The apparatus as claimed in claim 6, wherein the oil scraper arrangement has guides for guiding the carrier frame in said spatial direction, the oil scraper arrangement having guides for guiding the first frame sections of the carrier frame.

8. The apparatus as claimed in claim 6, wherein an attachment on one of the first frame sections of the carrier frame has a positively locking section for engaging an actuating means for displacing the carrier frame.

9. The apparatus as claimed in claim 8, wherein the actuating means is mounted rotatably in the oil scraper arrangement, and has an eccentric which interacts with the positively locking section of the carrier frame.

10. The apparatus as claimed in claim 8, wherein the actuating means has a groove which is arranged perpendicularly with respect to a pivoting axis of the actuating means for displaceably receiving a web of a cross coupling element, wherein a further web of the cross-coupling element, which is arranged perpendicularly with respect to said web, displaceably receives an actuating part of an electric actuating motor.

11. The apparatus as claimed in claim 8, wherein the actuating means is prestressed by a spring into an end position which corresponds to a final position of the carrier frame in said spatial direction.

12. The apparatus as claimed in claim 11, wherein, in a pre-assembled state of the apparatus, the actuating means is held captively via the carrier frame by a securing element.

13. The apparatus as claimed in claim 1, wherein the carrier frame includes holding lugs for pre-fixing the carrier frame in the oil scraper arrangement in an end position of the carrier frame.

14. The apparatus as claimed in claim 1, wherein each shift guide plate is a cast part, a sintered part, a precision cast steel part, or a sintered steel powder part.

15. The apparatus as claimed in claim 1, wherein the apparatus is a constituent part of an internal combustion engine which is configured as a boxer engine.

16. An apparatus for adjusting a length of connecting rods in an internal combustion engine, the apparatus comprising:
- a shift guide plate arrangement which has shift guide plates that are configured to be adjusted in one spatial direction for actuating connecting rod actuating means that are integrated into the connecting rods for the purpose of changing the length of the respective connecting rod,
- wherein the shift guide plates are fixedly connected to a carrier frame, the carrier frame being mounted in a stationary oil scraper arrangement such that the carrier frame is configured to be displaced in the spatial direction, and the oil scraper arrangement having oil scrapers for stripping oil from the connecting rods, wherein the oil scrapers are positioned in a recess formed in the shift guide plate arrangement.

17. An apparatus for adjusting a length of connecting rods in an internal combustion engine, the apparatus comprising:
- a shift guide plate arrangement which has shift guide plates that are configured to be adjusted in one spatial direction for actuating connecting rod actuating means that are integrated into the connecting rods for the purpose of changing the length of the respective connecting rod,
- wherein the shift guide plates are fixedly connected to a carrier frame, the carrier frame being mounted in a stationary oil scraper arrangement such that the carrier frame is configured to be displaced in the spatial direction, and the oil scraper arrangement having oil scrapers for stripping oil from the connecting rods, wherein the oil scrapers are positioned between shift guide plates.

* * * * *